(12) United States Patent
Kopolow et al.

(10) Patent No.: US 6,682,188 B2
(45) Date of Patent: Jan. 27, 2004

(54) INKJET PRINTING COMPOSITION

(75) Inventors: Stephen L. Kopolow, Plainsboro, NJ (US); John M C Kittrick, Jersey City, NJ (US); Michael Tallon, Aberdeen, NJ (US)

(73) Assignee: ISP Investments Inc., Wilmington, DE (US)

( * ) Notice: Subject to any disclaimer, the term of this patent is extended or adjusted under 35 U.S.C. 154(b) by 0 days.

(21) Appl. No.: 10/183,885

(22) Filed: Jun. 27, 2002

(65) Prior Publication Data

US 2004/0001130 A1 Jan. 1, 2004

(51) Int. Cl.$^7$ ............................................. B41J 2/01
(52) U.S. Cl. ..................... 347/100; 347/105; 347/101; 428/195
(58) Field of Search .................. 347/100, 105, 347/95, 101; 428/195

(56) References Cited

U.S. PATENT DOCUMENTS

| | | | | | |
|---|---|---|---|---|---|
| 5,320,902 | A | * | 6/1994 | Malhotra et al. | ........... 347/105 |
| 5,861,447 | A | * | 1/1999 | Nagasawa et al. | .......... 106/472 |
| 6,291,023 | B1 | * | 9/2001 | Nigam | .................... 427/389.9 |

* cited by examiner

*Primary Examiner*—Judy Nguyen
*Assistant Examiner*—Manish Shah
(74) *Attorney, Agent, or Firm*—Walter Katz; William J. Davis; Marilyn J. Maue

(57) ABSTRACT

An inkjet printing composition for coating a substrate to receive dye images thereon includes: (a) a polymer for absorbing said dye images, and (b) a dye fixative therein to inhibit migration of dye images from one part of the substrate to other portions thereof.

7 Claims, 1 Drawing Sheet

(1 of 1 Drawing Sheet(s) Filed in Color)

INKJET PRINTING COMPOSITION

BACKGROUND OF THE INVENTION

1. Field of the Invention

This invention relates to color ink-receptive medium, and more particularly, to new and improved color inkjet printing compositions which include a polymer for absorbing dye images, and a dye fixative to inhibit migration of dye images on substrates printed with such compositions.

2. Description of the Prior Art

Inkjet printing is a well recognized technology for computer printouts. The images are produced on substrates such as paper or polyester. Colored images also are made conveniently by inkjet printing systems. However, it is observed that the dye images obtained migrate from one part of the substrate to other portions thereof, casting an ink shadow on the printout.

Accordingly, it is the object of this invention to provide a color inkjet printing composition which inhibits or substantially precludes such undesirable ink migration on color ink-receptive medium.

SUMMARY OF THE INVENTION

What is described herein is a color inkjet printing composition for coating a substrate to receive dye images thereon which includes: (a) a polymer for absorbing said dye images, and (b) a dye fixative therein to inhibit dye migration from one part of the substrate to other portions thereof.

Suitable compositions of the invention are those wherein (b) is a quaternary ammonium compound; preferably having the formula:

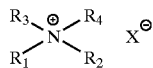

where $R_1$, $R_2$, $R_3$ and $R_4$ are alkyl or aryl, and $X^\ominus$ is an anionic counter ion.

Suitable compositions are those wherein (b) is present in an amount of at least 0.01 wt. % of the composition, preferably at least 0.1 wt. %.

Specific quat compounds include alkyldimethylbenzyl ammonium chloride, alkyldimethylethylbenzyl ammonium chloride, and dialkyldimethyl ammonium chloride. Other suitable compounds include a polymer with an ammonium quat as a substituent, e.g. quatemized vinyl pyrrolidone/dimethylamino ethyl methacrylate copolymer, vinylpyrrolidone/methacrylamidopropyl trimethylammonium chloride copolymer, or vinylpyrrolidone/dimethylaminopropyl methacrylamide copolymer.

Suitable (a) polymers include polyvinylpyrrolidone and the like.

IN THE DRAWINGS

This application file contains at least one drawing executed in color.

DESCRIPTION OF THE INVENTION

In accordance with the invention, a new and improved color-receptive medium and composition for printing a coating on the substrate of such medium is provided herein.

What is described herein is a color inkjet printing composition for coating a substrate to receive dye images thereon which includes: (a) a polymer for absorbing said dye images, and (b) a dye fixative therein to inhibit migration of dye images from one part of the substrate to other portions thereof.

Suitable compositions of the invention are those wherein (b) is a quaternary ammonium compound; preferably having the formula:

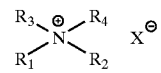

where $R_1$, $R_2$, $R_3$ and R4 are alkyl or aryl, and $X^\ominus$ is an anionic counter ion.

Suitable compositions are those wherein (b) is present in an amount of at least 0.01 wt. % of the composition, preferably at least 0.1 wt. %.

Specific quat compounds include alkyldimethylbenzyl ammonium chloride, alkyldimethylethylbenzyl ammonium chloride, and dialkyldimethyl ammonium chloride. Other suitable compounds include a polymer with an ammonium quat as a substituent, e.g. quatemized vinyl pyrrolidone/dimethylamino ethyl methacrylate copolymer, vinylpyrrolidone/methacrylamidopropyl trimethylammonium chloride copolymer, or vinylpyrrolidone/dimethylaminopropyl methacrylamide copolymer.

Suitable (a) polymers include polyvinylpyrrolidone and the like.

Figure 1:
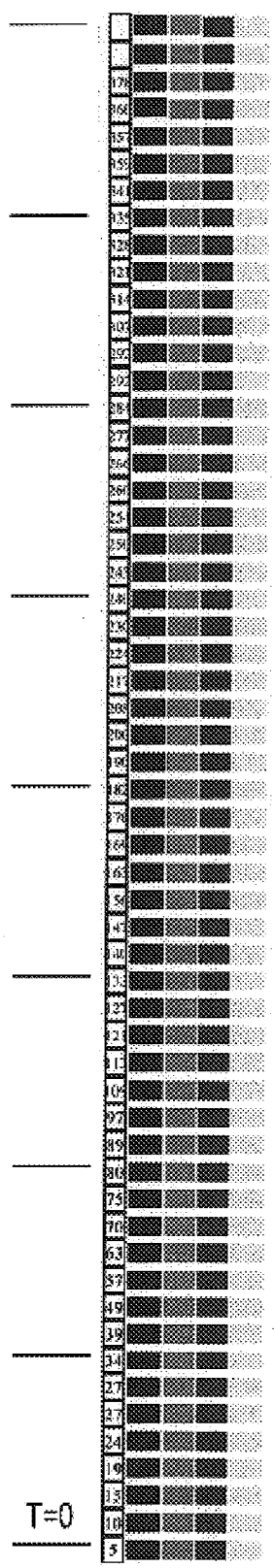
FIG. 1 shows ink migration using compositions of the prior art.
Figure 2:
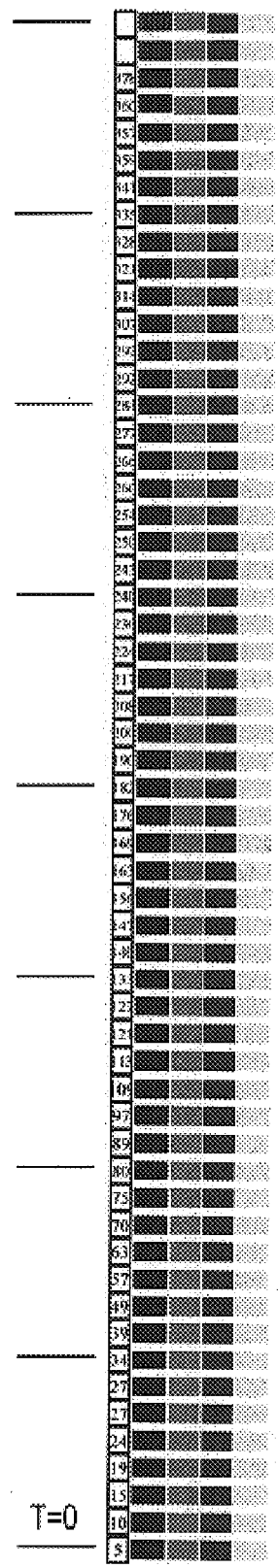
FIG. 2 shows inhibited ink migration using the color inkjet composition of the present invention.

Referring now to the FIGURES, in FIG. 1 substantial color ink migration is evident with standard color inkjet formulations as practiced in the art, i.e. without any dye fixative therein. In contrast, as shown in FIG. 2, the presence of a quaternary ammonium compound as dye fixative therein; specifically quaternary vinyl pyrrolidone/methacrylamido trimethylammonium chloride, in an amount of 0.1 wt %. The composition substantially eliminated the dye migration on the printed polyester substrate.

While the invention has been described with particular reference to certain embodiments thereof, it will be understood that changes and modifications may be made which are within the skill of the art. Accordingly, it is intended to be bound only by the following claims, in which.

What is claimed is:

1. A color inkjet printing composition for coating a paper or polyester substrate to receive dye images thereon comprising:
    (a) a polymer for absorbing said dye images, and
    (b) a dye fixative therein to inhibit migration of images from one part of the substrate to other portions thereof, which is a polymer with an ammonium quat as a substituent.

2. A composition according to claim 1 wherein the quaternary ammonium substituent has the formula:

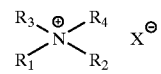

where $R_1$, $R_2$, $R_3$ and $R_4$ are alkyl or aryl, and $X^\ominus$ is an anionic counter ion.

3. A composition according to claim 1 wherein (b) is present in an amount of at least 0.01 wt. % of the composition.

4. A composition according to claim 3 wherein said amount is at least 0.1 wt. %.

5. A composition according to claim 3 wherein said quaternary ammonium substituent is selected from alkyldimethylbenzyl ammonium chloride, alkyldimethylethylbenzyl ammonium chloride, and dialkyldimethyl ammonium chloride.

6. A composition of claim 1 wherein the polymer (a) is polyvinylpyrrolidone.

7. A composition according to claim 1 wherein the polymer with said ammonium quat substituent is quaternized vinyl pyrrolidone/dimethylamino ethyl methacrylate copolymer, vinylpyrrolidone/methacrylamidopropyl trimethylammonium chloride copolymer, or quaternized vinylpyrrolidone/dimethylaminopropyl methacrylamide copolymer.

* * * * *